(12) United States Patent
Bogacz

(10) Patent No.: US 11,012,606 B1
(45) Date of Patent: May 18, 2021

(54) SYSTEMS AND METHODS FOR DIRECTLY FOCUSING ON FEATURES IN IMAGES AND MAPS

(71) Applicant: Illuscio, Inc., Culver City, CA (US)

(72) Inventor: Joseph Bogacz, Perth (CA)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/011,622

(22) Filed: Sep. 3, 2020

(51) Int. Cl.
*H04N 5/232* (2006.01)
*G06K 9/46* (2006.01)
*G03B 13/36* (2021.01)

(52) U.S. Cl.
CPC ......... *H04N 5/23212* (2013.01); *G03B 13/36* (2013.01); *G06K 9/4652* (2013.01); *H04N 5/23218* (2018.08); *H04N 5/23293* (2013.01)

(58) Field of Classification Search
CPC ........ G02B 27/01; H04N 5/247; H04N 5/265; H04N 5/76; G06K 9/00805
See application file for complete search history.

(56) References Cited

U.S. PATENT DOCUMENTS

| | | | | |
|---|---|---|---|---|
| 9,137,448 B2 * | 9/2015 | Uemura | ........... | H04N 5/232945 |
| 10,015,404 B2 * | 7/2018 | Hara | ................ | H04N 5/232127 |
| 2010/0189427 A1 * | 7/2010 | Ilya | ..................... | H04N 5/23218 |
| | | | | 396/95 |
| 2011/0096187 A1 * | 4/2011 | Steinberg | ........... | H04N 5/23299 |
| | | | | 348/222.1 |
| 2015/0070357 A1 * | 3/2015 | Tahan | ....................... | G06F 3/14 |
| | | | | 345/428 |
| 2016/0381301 A1 * | 12/2016 | Shroff | ..................... | G06T 11/60 |
| | | | | 348/240.3 |

* cited by examiner

*Primary Examiner* — Peter D Nolan
*Assistant Examiner* — Demetra R Smith-Stewart
(74) *Attorney, Agent, or Firm* — Ansari Katiraei LLP; Arman Katiraei; Sadiq Ansari

(57) ABSTRACT

Provided is a controller for automatically providing centered and zoomed-in focus to different features in an image based on a single user input provided on or near those features. The controller may receive an image that is centered on a first point and that is presented at a first zoom depth, and may detect a feature at a different second point in the image. The controller may define a selectable region that extends beyond a border of the feature, and may detect a single user input issued outside the border of the feature, but within the selectable region. In response to the single user input, the controller may center the image on the second point of the feature, and may increase from the first zoom depth to a second zoom depth in order to enlarge view of the feature.

20 Claims, 11 Drawing Sheets

US 11,012,606 B1

SYSTEMS AND METHODS FOR DIRECTLY FOCUSING ON FEATURES IN IMAGES AND MAPS

BACKGROUND

User interfaces ("UIs") may provide controls for moving within an image or map. However, the controls remain counter-intuitive and inefficient. For instance, double-clicking on an image or map does not change the camera position and instead causes the camera to zoom into the image or map from the camera's current position. A user may then manually adjust the position of the camera, via a click and drag operation. In other words, the UI does not provide a single operation for obtaining a zoomed-in view of an off-center feature in the image or map.

DETAILED DESCRIPTION OF PREFERRED EMBODIMENTS

Figure 1:
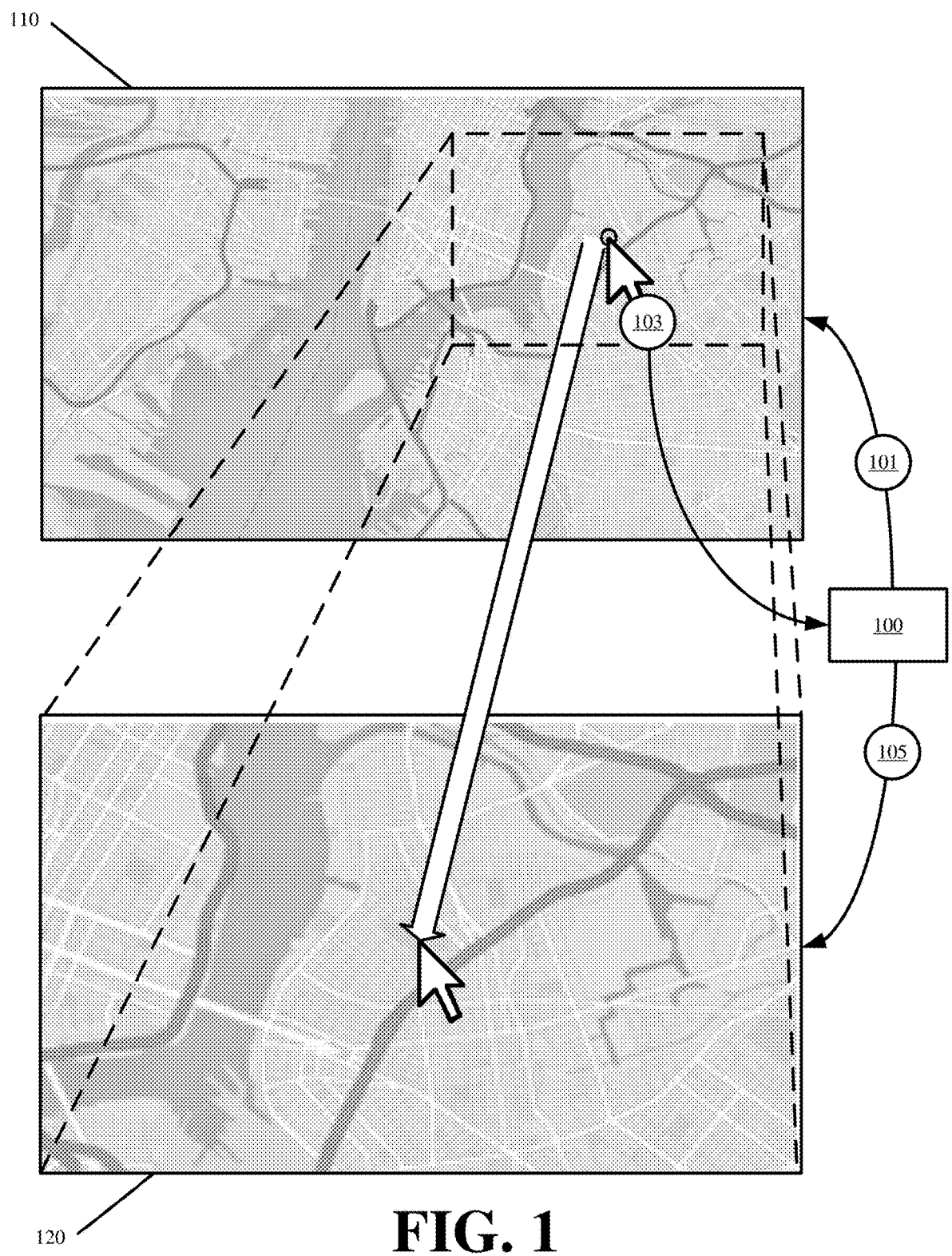
FIG. 1 illustrates an example of a controller providing focus to a particular feature in response to a single user input in accordance with some embodiments presented herein.

The following detailed description refers to the accompanying drawings. The same reference numbers in different drawings may identify the same or similar elements.

Provided are systems and methods for directly focusing on features in an image, map, and/or digital environment. The systems and methods may include a controller for automatically providing focus to different features in the image, map, and/or digital environment based on a single user input (e.g., a single click, a single double-click, a single keystroke, a touch gesture, a single key combination, etc.) that is provided on or near those features. The controller may automatically provide focus to a particular feature by adjusting the camera position (e.g., shifting the horizontal and/or vertical of the camera) so that the camera and/or camera field-of-view is centered on the particular feature, and by adjusting the camera depth (e.g., zoom) to enlarge the particular feature in response to the single user input. In other words, the controller may structure and control two or more different camera properties (e.g., the camera position, zoom depth, field-of-view, etc.) based on receipt or detection of a single user input, and/or the single user input being provided away from the feature that becomes the center point of the camera.

In some embodiments, the controller may dynamically adjust the camera positioning and depth based on characteristics of the focused feature and/or characteristics of features surrounding the focused feature. The dynamic adjustment of the camera positioning may include providing centered, front, angled, and/or other views of different features based on the characteristics of those features. Similarly, the dynamic adjustment of the camera depth or zoom may include zooming-in by different amounts to different features based on the characteristics of those features.

For instance, the controller may provide a perspective view of a business storefront with a first zoom level that includes parts of neighboring businesses when a selected first feature is a particular business that is selected from multiple businesses appearing in a map, and may provide a front view that is centered on a person's nose with a different second zoom level that starts at the person's neckline and ends at the top of the person's head when a selected second feature is a person appearing in an image with other persons. Accordingly, the controller does not statically adjust the camera to present the same view at the same zoom depth for different features in the same or different images, maps, and/or digital environments.

By directly providing focus (e.g., re-centering the camera, adjusting the zoom, etc.) to different off-center features based on a single user input, the controller may provide faster user access to desired information (e.g., a single user input to obtain a centered and appropriately zoomed-in view of a particular feature amongst a plurality of features in an image, map, or digital environment). The structured and controlled camera positioning and adjustment in response to single user input is especially advantageous in highly detailed or high-resolution imagery where a particular desired feature may appear miniscule, may be difficult to find, or may be too small to directly select when the image, map, or digital environment is at an initial zoom depth or level.

For instance, an image may have a 1024×800 resolution, and a 10×10 set of pixels may represent a particular feature or point-of-interest in that image. Accurately selecting and/or zooming-in on such a small set of pixels amongst thousands or millions of pixels may be difficult. Traditionally, the user would have to provide multiple inputs (e.g., two or more inputs) in order to gradually zoom into the image and to repeatedly adjust the camera position so that the particular feature is retained in the camera field-of-view until the particular feature is large enough to select. The user may then provide additional inputs to select the particular feature or to further adjust the camera positioning and/or zoom to properly focus on the particular feature.

Rather than require the user to provide numerous inputs to gradually focus on the particular feature, the controller may directly focus on the particular feature in response to a single user input. Moreover, the single user input may be issued off or away from the boundaries of the particular feature (e.g., outside the 10×10 set of pixels representing the particular feature), and the controller may nevertheless directly focus on the particular feature in response to the single user input being issued in range or an area of the particular feature, wherein directly focusing on the particular feature may include the controller adjusting the camera position to be centered on the pixels that represent the particular feature and adjusting the level of zoom to enlarge the particular feature for proper viewing.

FIG. 1 illustrates an example of controller 100 providing focus to a particular feature in response to a single user input in accordance with some embodiments presented herein. Controller 100 may initially present (at 101) first image 110. In this example, first image 110 is a map showing a first area at a first zoom level.

Controller 100 may present (at 101) first image 110 on a user device. Controller 100 may run on the user device, and may provide the structured and controlled camera movement and positioning directly on the user device, or may run in the "cloud" on a device that provides the structured and controlled camera positioning and adjustment for direct feature focus remote from the user device based on the user device requesting and/or accessing images from controller 100 over a data network.

Controller 100 may monitor user interactions with first image 110. Controller 100 may detect (at 103) a particular user input that is provided away from the center of first image 110. The particular user input may be issued or applied on or in association with a particular feature or a particular position in first image 110. The particular user input may include singular input for focusing on the particular feature or the particular position. For instance, the particular user input may include a single double-click of the cursor on the particular feature or at the particular position.

In some embodiments, the particular user input may include input that is not mapped to any image and/or camera manipulation operations, and is exclusively reserved for focusing on an image feature. In some other embodiments, controller 100 may override input that is mapped to an existing image and/or camera manipulation operation so that the input can instead be used for focusing (e.g., centering and zooming-in) on different features. For instance, a cursor double-click operation may traditionally be used to zoom-in by a certain amount on the center point of first image 110 without moving the camera or changing the center point of first image 110. Controller 100 may override the cursor double-click operation to center on and zoom-in on the selected particular feature or the particular position where the cursor double-click operation is performed. The particular user input may include any operation applied in a user interface via a mouse, trackpad, and/or touch, and/or any operation performed by activation or deactivation of one or more keyboard keys.

In response to the particular user input for focusing on the particular feature or the particular position, controller 100 may generate and/or present (at 105) second image 120. Controller 100 may generate second image 120 by centering the camera on the particular feature or the particular position, corresponding to the position where the particular user input was issued on first image 110, and by zooming-in the camera on the particular feature or the particular position. Accordingly, second image 120 may provide a centered and enlarged view of the particular feature or the particular position in response to the particular user input.

In some embodiments, controller 100 may also adjust the position of the cursor or user control element as part of presenting (at 105) second image 120. In particular, the cursor may be at an off-center first position in first image 110 when the particular user input is issued. Controller 100 may center second image 120 on the selected particular feature or particular position, and may also move the cursor so that it remains on the newly centered particular feature or particular position in second image 120. In some other embodiments, controller 100 may leave the cursor at the last position when presenting (at 105) second image 120. For instance, the cursor is at the upper right side of first image 110, and the cursor may remain at that upper right-side position in second image 120.

It should be noted that controller 100 may perform other traditional inputs, and may modify the view of either first image 110 or second image 120 based on those inputs. For instance, controller 100 may move the camera position up, down, or to the side in response to a first set of user inputs (e.g., click and drag), and may adjust the camera zoom in response to a different second set of user inputs (e.g., scroll wheel activation).

First image 110 may provide the map at an initial zoom level that makes direct selection of the particular feature or the particular position with a single input very difficult. For instance, the particular feature may appear as a small subset of pixels (e.g., tens of pixels) within a display of millions of pixels (e.g., a display resolution of 1920×1080 pixels), and precise selection of one or more of the small subset of pixels may be difficult or impossible on a small screen device (e.g., a smartphone) or with available input devices (e.g., mouse, trackpad, etc.). Alternatively, the particular feature may correspond to a particular coordinate, position, and/or graphical element that is of particular interest and difficult to select at the initial zoom level.

Controller 100 may determine that the particular feature is of particular interest in that region of first image 110. Accordingly, in some embodiments, controller 100 may provide focus on the particular feature at the particular position in first image 110 even when the particular user input is not provided directly on the particular feature or at the particular position in first image 110.

Figure 2:
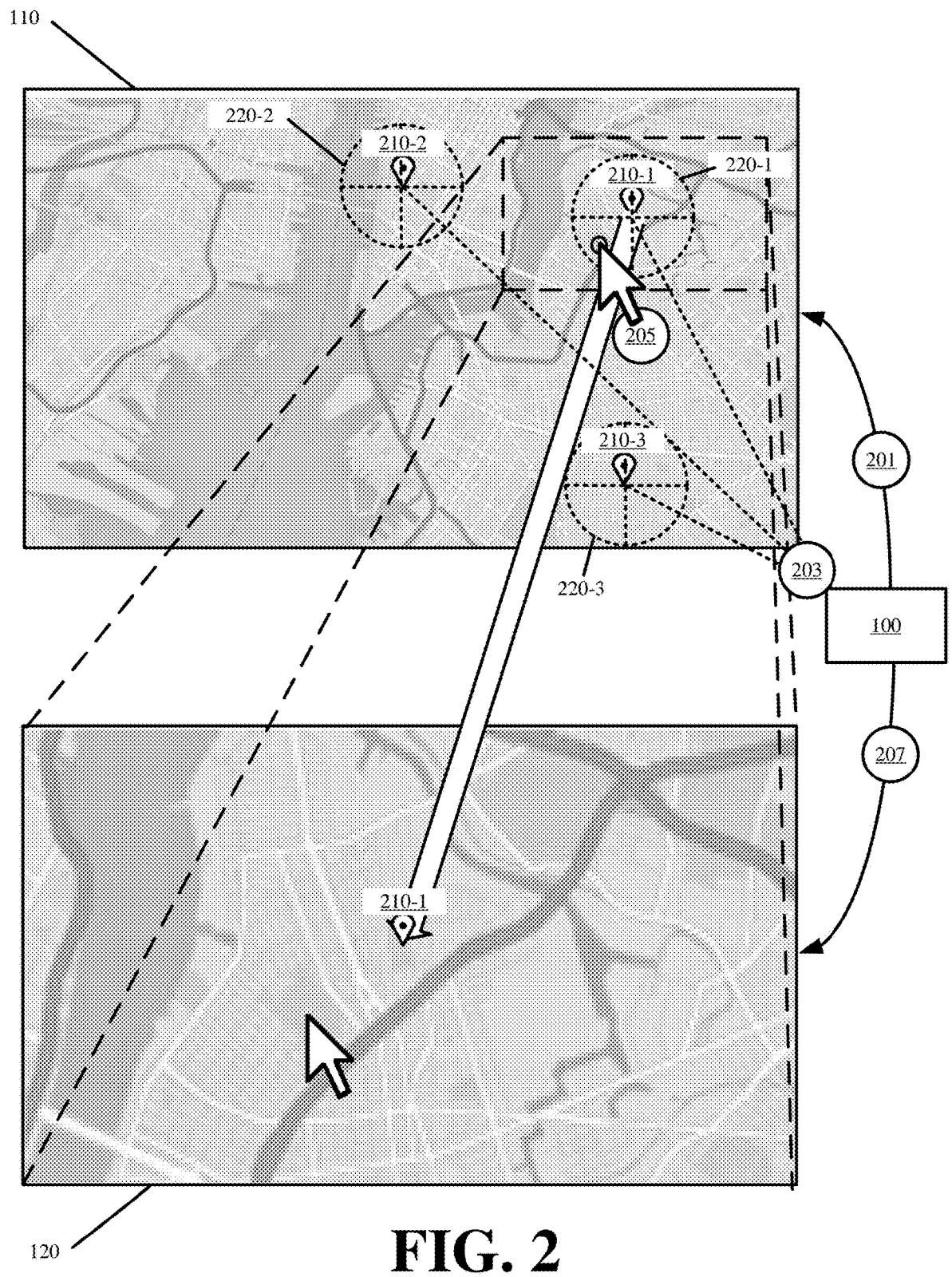
FIG. 2 illustrates an example of the controller focusing on a particular feature in an image based on single user input that is provided away from the particular feature in accordance with some embodiments presented herein.

FIG. 2 illustrates an example of controller 100 focusing on a particular feature in an image based on single user input that is provided away from the particular feature in accordance with some embodiments presented herein. Controller 100 may again present (at 201) first image 110 as a map showing a first area at a first zoom level. Controller 100 may also process first image 110 and/or data of or associated with first image 110.

Controller 100 may automatically detect (at 203) and/or differentiate different features 210-1, 210-2, and 210-3 (sometimes collectively referred to as "features 210" or individually as "feature 210") that appear within first image 110 via image analysis and/or metadata associated with first image 110. In particular, controller 100 may determine a center point for each feature 210 and/or a position of each feature 210 in first image 110.

Controller 100 may also define (at 203) selectable region 220 around each feature 210 or center point (e.g., selectable region 220-1 around feature 210-1, selectable region 220-2 around feature 210-2, and selectable region 220-3 around feature 210-3). Each selectable region 220 may extend beyond the boundary of an associated feature 210. For instance, particular feature 210-1 may appear as 50 contiguous pixels in first image 110, and selectable region 220-1 for particular feature 210-1 may encompass the 50 contiguous pixels and an additional 150 pixels that surround or extend away from the 50 contiguous pixels of particular feature 210-1. Alternatively, each selectable region 220 may be defined as a unit of measure or set of coordinates around a corresponding feature 210. For instance, each selectable region 220 may be defined to encompass a one-mile radius around a feature 210, wherein the one-mile radius is defined according to the units of measure at which first image 110 is presented. Similarly, each selectable region 220 may be defined with a border that is 5 degrees latitude and longitude around or away from a corresponding feature 210.

In some embodiments, controller 100 may display an icon, identifier, or other indicator for each feature 210 in first image 110, and/or may display selectable region 220 around each feature 210. In some other embodiments, controller 100 may hide visual indicators for features 210 and/or selectable region 220.

Controller 100 may monitor user interactions with first image 110. Controller 100 may detect (at 205) particular user input being issued away from the center of first image 110, away from a center point or the subset of pixels, coordinates, positioning data, and/or another unit of measure representing particular feature 210-1, and within selectable region 220-1 that is defined (at 203) for particular feature 210-1.

In response to detecting (at 205) the particular user input, controller 100 may determine that the particular user input is provided to change focus from the center of first image 110 to a centered and enlarged view of particular feature 210-1. Accordingly, controller 100 may generate and/or present (at 207) second image 120 to provide the centered and enlarged view of particular feature 210-1. Controller 100 may generate second image 120 by centering the camera on particular feature 210-1, and by zooming-in the camera on particular feature 210-1 by a defined amount of zoom.

In some embodiments, controller 100 may customize the camera position and amount of zoom based on the selected feature 210 and/or size of selectable region 220. For instance, controller 100 may position the camera directly at the center point of particular feature 210-1, and may adjust the zoom to have the camera's field-of-view encompass the parts of first image 110 that fall within selectable region 220-1. Alternatively, controller 100 may determine that particular feature 210-1 is classified as a store, and may position the camera and adjust the zoom to provide an angled side view of the storefront with at least part of a neighboring storefront. When the images are presented as two-dimensional ("2D") images, adjusting the camera position may include modifying x-coordinate and y-coordinate positioning of the camera relative to the image. When the images are presented as three-dimensional ("3D") images, adjusting the camera position may include modifying the x-coordinate, y-coordinate, and z-coordinate positioning of the camera. In other words, controller 100 may customize the camera position by accounting for the vertical, horizontal, and depth-positioning of the selected feature 210.

In any case, second image 120 may provide a centered and enlarged view of particular feature 210-1 in response to the particular user input that was provided away or off particular feature 210-1, but within selectable region 220-1 that controller 100 defined (at 203) for particular feature 210-1. It is important to note that controller 100 does not center and zoom-in on the position where the particular user input was issued in first image 110 or on the position of the cursor as was illustrated in FIG. 1 above, but rather on particular feature 210-1 that is within selectable region 220-1 and closest to where the particular user input was issued.

Once again, controller 100 may adjust the position of the cursor when presenting (at 207) second image 120. Since second image 120 is not centered on where the particular user input was issued, controller 100 may determine the position of the cursor relative to the center point of particular feature 210-1, and may reposition the cursor in second image 120 to retain the cursor position relative to the center point of particular feature 210-1, wherein the center point of particular feature 210-1 may become the center point of second image 120.

Controller 100 may define different selectable regions 220 for different features 210 of an image. Each selectable region 220 may be defined as a regular shape or irregular shape extending around a different feature 210.

Figure 3:
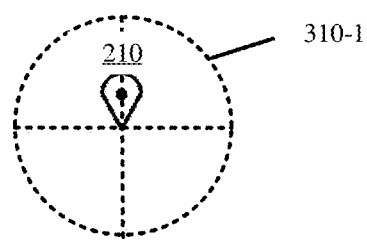
FIG. 3 illustrates examples of different selectable regions for a feature that is detected in an image in accordance with some embodiments presented herein.
Figure 3:
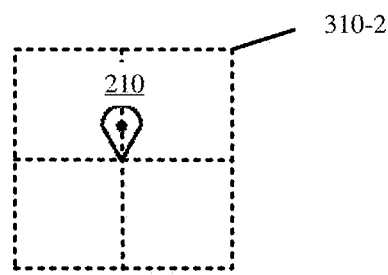
Figure 3:
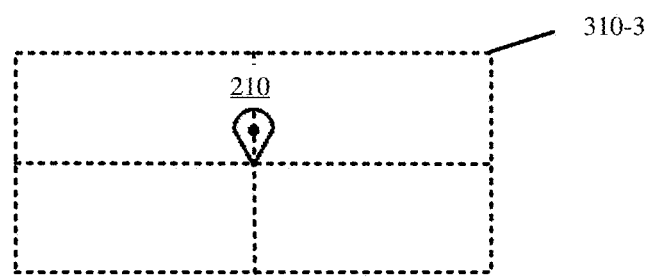
Figure 3:
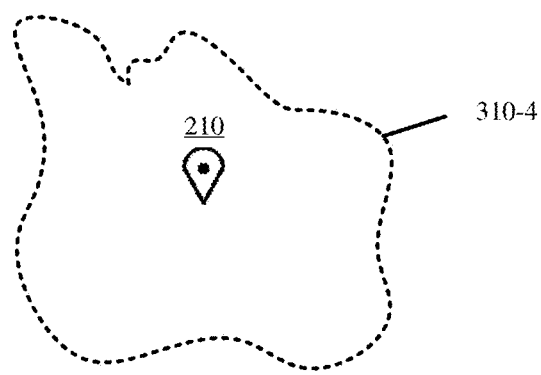

FIG. 3 illustrates examples of different selectable regions 310-1, 310-2, 310-3, and 310-4 for feature 210 that is detected in an image in accordance with some embodiments presented herein. As shown in FIG. 3, controller 100 may define first selectable region 310-1 to be a circular area extending around particular feature 210. Controller 100 may define second selectable region 310-2 to be a square-shaped area extending around particular feature 210, third selectable region 310-3 to be a rectangular-shaped area extending around particular feature 210, and fourth selectable region 310-4 to be an irregular or custom-shaped area extending around particular feature 210. In a 3D image, selectable region 310-1 may correspond to a spherical volume, selectable region 310-2 may correspond to a cubic volume, selectable region 310-3 may correspond to a cuboid volume, and selectable region 310-4 may correspond to an irregular or custom-shaped 3D volume around particular feature 210.

Any or all of selectable regions 310-1, 310-2, 310-3, and 310-4 (sometimes collectively referred to as "selectable regions 310" or individually as "selectable region 310") and/or other selectable regions may be centered on the center point of particular feature 210, or may be offset from the center point of particular feature 210. In any case, each selectable region 310 may include an area, volume, spatial coordinates, unit of distance, unit of measure, or set of pixels that extends beyond the periphery, boundary, and/or border of particular feature 210 or the set of pixels that represent particular feature 210 in an image.

In some embodiments, controller 100 may define the shape for a selectable region based on the shape of the particular feature that is brought into focus by that selectable region, and/or the shape of other neighboring features. For instance, particular feature 210 may be a point of interest that has an irregular shape (e.g., a shopping mall, a restaurant, a property, etc.). Accordingly, controller 100 may define a custom selectable region for particular feature 210 that extends a certain distance, measure, coordinates, or number of pixels from the irregular shape or edge pixels of particular feature 210. Alternatively, controller 100 may determine the boundary and/or center point of particular feature 210, may determine the boundary and/or center point of neighboring features in the same image, and may define a custom shape for the selectable region of particular feature 210 so that the selectable region of particular feature 210 does not overlap with or prevent selection of the neighboring features in the same image.

In some embodiments, controller 100 may define the shape for a selectable region based on the image data around particular feature 210. For instance, controller 100 may identify a person's head as a feature in an image with multiple people. Controller 100 may determine that pixels corresponding to whitespace or the image background are not of interest, and may define an irregular-shaped selectable region that extends away from the person's head, and that includes some number of the whitespace or image background pixels surrounding the person's head. Alternatively, controller 100 may define a selectable region that extends some distance, number of pixels, coordinates, and/or other measure away from the head or a sub-feature of the head (e.g., nose).

Defining the shape for a selectable region may also include customizing the selectable region size based on the zoom level at which an image is presented. For instance, when particular feature 210 appears in an image with a first size due the image being presented at a first zoom depth, controller 100 may increase the size for the selectable region of that particular feature 210, and when particular feature 210 appears in the image with a second size due the image being presented at a different second zoom depth, controller 100 may decrease the size for the selectable region of that particular feature 210. The first zoom depth may correspond to displaying the image from a zoomed-out view (e.g., no zoom), and the second zoom depth may correspond to displaying the image from a zoomed-in view (e.g., with 150% zoom). Alternatively, the first zoom depth may correspond to displaying the image from a zoomed-in view, and the second zoom depth may correspond to displaying the image from a zoomed-out view.

The structured and controlled camera positioning and adjustment provided by controller 100 as part of directly focusing on different features 210 may be predicated on the detection and differentiation of the different features 210 in an image or map. Features 210 may correspond to specific points or areas in an image or map that are of specific importance or relevance. For example, features 210 may correspond to points-of-interest, specific businesses or properties (e.g., restaurants, shopping malls, amusement parks, gas stations, etc.), coordinates, and/or other objects in a map that meet user-specified search criteria (e.g., Asian restaurants, Barbeque restaurants, etc.). Features 210 may also correspond to parts or groups of pixels in an image that satisfy various criteria or thresholds, meet certain patterns, have specific shapes, and/or have specific visual characteristics. For instance, features 210 may correspond to subsets of pixels with visual characteristics of an eye or nose on a face, other objects, and/or waypoints. In medical imagery (e.g., Magnetic Resonance Imaging ("MRI"), Positron Emission Tomography ("PET"), Computerized Tomography ("CT"), X-ray, and/or other scans or images), features 210 may correspond to subsets of pixels or image data (e.g., coloring, Tesla values, and/or other values) with characteristics that identify regions of trauma, inflammation, infection, cancerous growths, and/or other medical significance.

In some embodiments, features 210 in an image or map may be predefined or previously determined, and may be identified in the metadata or other data of the image or map. In some such embodiments, controller 100 may obtain the image or map, may process the metadata, and may detect and/or differentiate different features 210 as a result of processing the metadata. For instance, a third-party may tag certain parts of an image as features 210 for subsequent or repeat viewing, and the tags may be stored as part of the image data, the image file, or the image metadata. Each tag may provide coordinates, a set of pixels, or regions of the image that correspond to a different feature 210. Accordingly, when controller 100 receives the image file, controller 100 may read in the file metadata, load the image, and may overlay or otherwise determine the positions, addresses, and/or edges of the different features 210 based on the metadata.

In some embodiments, controller 100 may be integrated or part of a network accessible service, and may receive information about features 210 in an image or map as data for the accessible service is generated or provided to a user device. For instance, a user device may request access to an online mapping service, and the online mapping service may provide an initial map based on the user device location. The user device may submit a query for specific points-of-interest (e.g., gas stations, restaurants, etc.), and the online mapping service may populate the map with the positions and/or other information about the specific points-of-interest. Controller 100 may detect and/or differentiate features 210 that correspond to the specific points-of-interest based on the data that is generated and/or provided in response to the query for the specific points-of-interest. For instance, the online mapping service may place a set of pins on the map to indicate the locations of the specific points-of-interest, and controller 100 may define each pin as a feature 210 that can be directly focused on using the structured and controlled camera positioning and adjustment set forth herein.

In some embodiments, controller 100 may automatically discover features 210 in an image or map. In some such embodiments, controller 100 may perform image analysis to detect features 210 that satisfy various criteria or thresholds, meet certain patterns, have specific shapes, and/or have specific visual characteristics.

Figure 4:
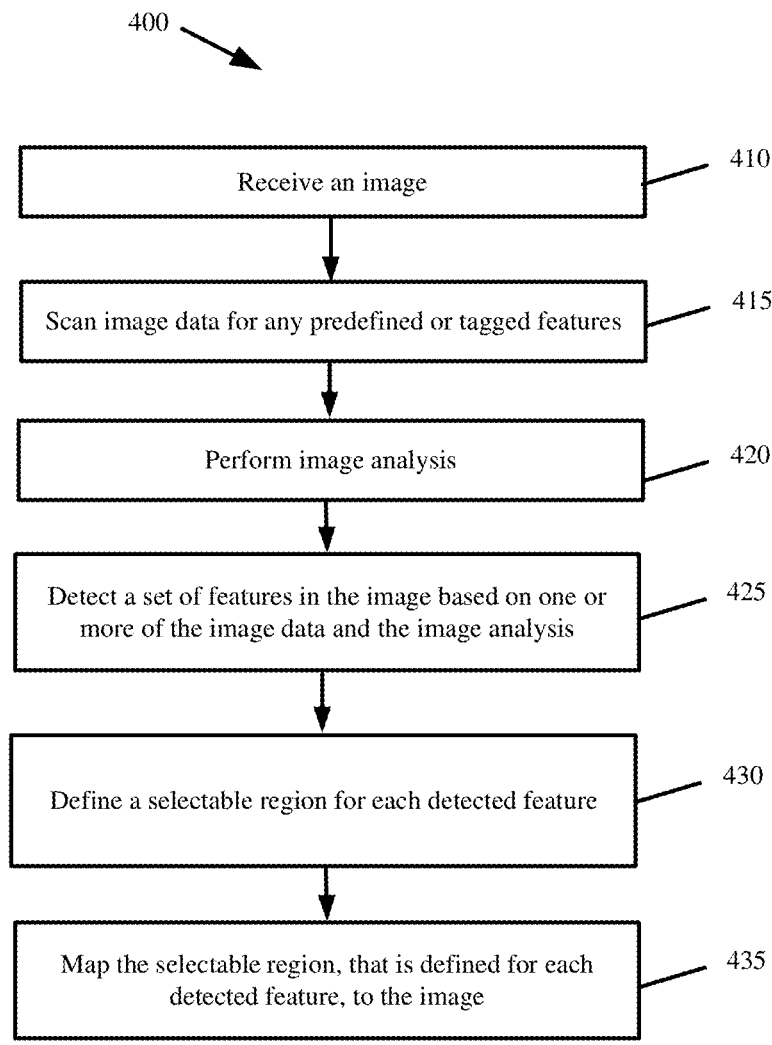
FIG. 4 presents a process for detecting image features and defining selectable regions in accordance with some embodiments presented herein.

FIG. 4 presents a process 400 for detecting image features and defining selectable regions in accordance with some embodiments presented herein. Process 400 may be performed by controller 100.

Process 400 may include receiving (at 410) an image. The image may present one or more people, objects, scenes, and/or maps. The image may be in a JPG, TIF, PNG, and/or other image file format, and can represent a 2D or 3D image.

Process 400 may include scanning (at 415) the image (e.g., the image data, metadata, and/or data provided with the image) for any predefined or tagged features. For instance, the image may include data for waypoints, pins, coordinates, and/or elements that correspond to features. In particular, controller 100 may receive an image of people that has been tagged to identify each person in the image. Alternatively, controller 100 may receive a map of a region, and may later receive data corresponding to pins for points-of-interest that meet user specified criteria. In some embodiments, controller 100 may scan the data to determine locations of various points-of-interest or the predefined features.

Process 400 may include performing (at 420) image analysis of the received image. The image analysis may include rendering the image and/or scanning the image data to detect regions, relative distances, coordinates, and/or sets of pixels in the image that satisfy various criteria or thresholds, meet certain patterns, have specific shapes, and/or have specific visual characteristics. For example, controller 100 may automatically detect people in an image based on defined pixel patterns, relative distances, and/or visual characteristics for eyes, nose, and other facial features. As another example, controller 100 may detect features based on regions with visual characteristics that deviate from other neighboring regions (e.g., different coloring, brightness, contrast, etc.). Regions with deviating visual characteristics may be correspond to or identify regions of damage, trauma, inflammation, infection, cancerous growths, and/or other visual significance or anomaly.

Process 400 may include detecting (at 425) a set of features in the image based on one or more of the scanning (at 415) of image data and the performing (at 420) of the image analysis. Detecting (at 425) the set of features may include determining a position (e.g., pixels, coordinates, address, etc.) of each feature in the image, the shape or edges of each feature, and a center point for each feature in the image. Accordingly, controller 100 may map each detected feature to a different set of pixels that present that feature in the image.

Process 400 may include defining (at 430) a selectable region for each detected feature. The selectable region for a particular feature may include parts of the image or pixels that extend beyond the edges, border, and/or boundary of that particular feature. The selectable region for a particular feature increases the input area for focusing on the particular feature with a single user input such that the single user input need not be precisely issued on the particular feature or at a position of the particular feature in the image.

Controller 100 may define (at 430) the selectable region for a particular feature based on one or more of the position, pixels, address, size, shape, and center point of the particular feature, one or more of the position, pixels, address, size, shape, and center point of neighboring features, units of distance or measure associated with the image, and/or visual characteristics of the pixels surrounding the particular feature. Controller 100 may also define (at 430) the selectable region for the particular feature based on the current zoom level at which the image is presented. In particular, controller 100 may define (at 430) the selectable region to encompass a sufficient number of pixels (e.g., at least 100×100 pixels for a feature that is 10×10 pixels) or screen area (e.g., at least 5% of the screen area) to make selection of the particular feature simple without overlapping or conflicting with the selectable regions of neighboring features. In some embodiments, controller 100 may define (at 430) the selectable region to encompass some distance, coordinates, and/or another unit of measure around or away from the particular feature.

Process 400 may include mapping (at 435) the selectable region, that is defined for each detected feature, to the image. In particular, controller 100 may overlay the selectable region of a particular feature over the image with the selectable region centered on or encompassing the center point of that particular feature in the image. In some embodiments, mapping (at 435) the selectable region may include presenting the selectable region around each feature as part of displaying the image. In some other embodiments, the selectable region may be hidden (e.g., not displayed onscreen), but may be monitored by controller 100 for issuance of the particular user input that is used to directly bring focus to a particular feature within the selectable region.

Figure 5:
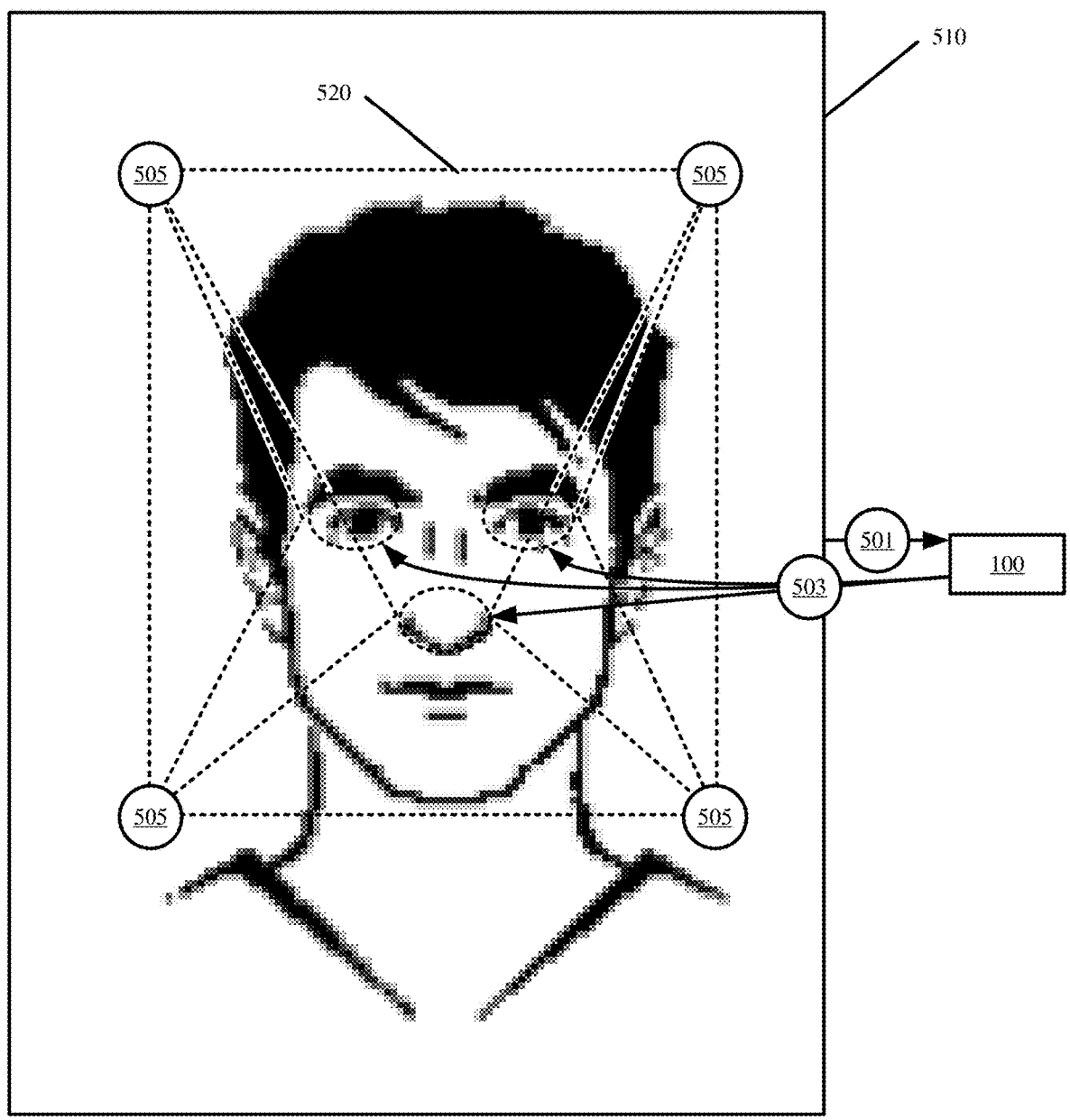
FIG. 5 illustrates an example of the automatic feature detection performed by the controller in accordance with some embodiments presented herein.

FIG. 5 illustrates an example of the automatic feature detection performed by controller 100 in accordance with some embodiments presented herein. As shown in FIG. 5, may receive (at 501) image 510 that includes a person. Image 510 may include other objects that are not illustrated in FIG. 5 for purposes of simplicity.

Controller 100 may perform image analysis, and may detect (at 503) the eyes and/or nose in image 510 as features. For instance, controller 100 may determine that the visual characteristics for the sets of pixels at each eye and the nose match, by a threshold, to the visual characteristics that are defined for one or more features. More specifically, controller 100 may determine that a set of pixels having a first subset of pixels in a circular shape with a first eye color, having a neighboring second subset of pixels in a circular or oblong shape with white coloring, and having a surrounding third subset of pixels with skin coloring corresponds to an eye. Alternatively, controller 100 may determine that the visual characteristics at a first position in image 510 are a certain distance and angle from a similar or matching visual characteristics at a different second position in image 510, and that the match corresponds to detecting the eyes, ears, eyebrows, and/or other features.

Controller 100 may define (at 505) selectable region 520 around the person's head based on one or more of the detected features. As shown, controller 100 may define (at 505) selectable region 520 as a rectangle that extends some number of pixels or some distance from each of the detected features (e.g., the detected eyes and/or nose). In some embodiments, controller 100 may scan outwards from the detected features in order to detect the outline of the person's head, and may define (at 505) selectable region 520 to extend beyond the outline of the person's head. In some other embodiments, controller 100 may determine the outline of the person's head, and may define (at 505) selectable region 520 to be an irregular shape that matches the outline of the person's head. User input that is provided within selectable region 520 may subsequently be used to directly focus on the person's head by centering the camera's position on the one or more features, and by zooming-in on the person's head.

Figure 6:
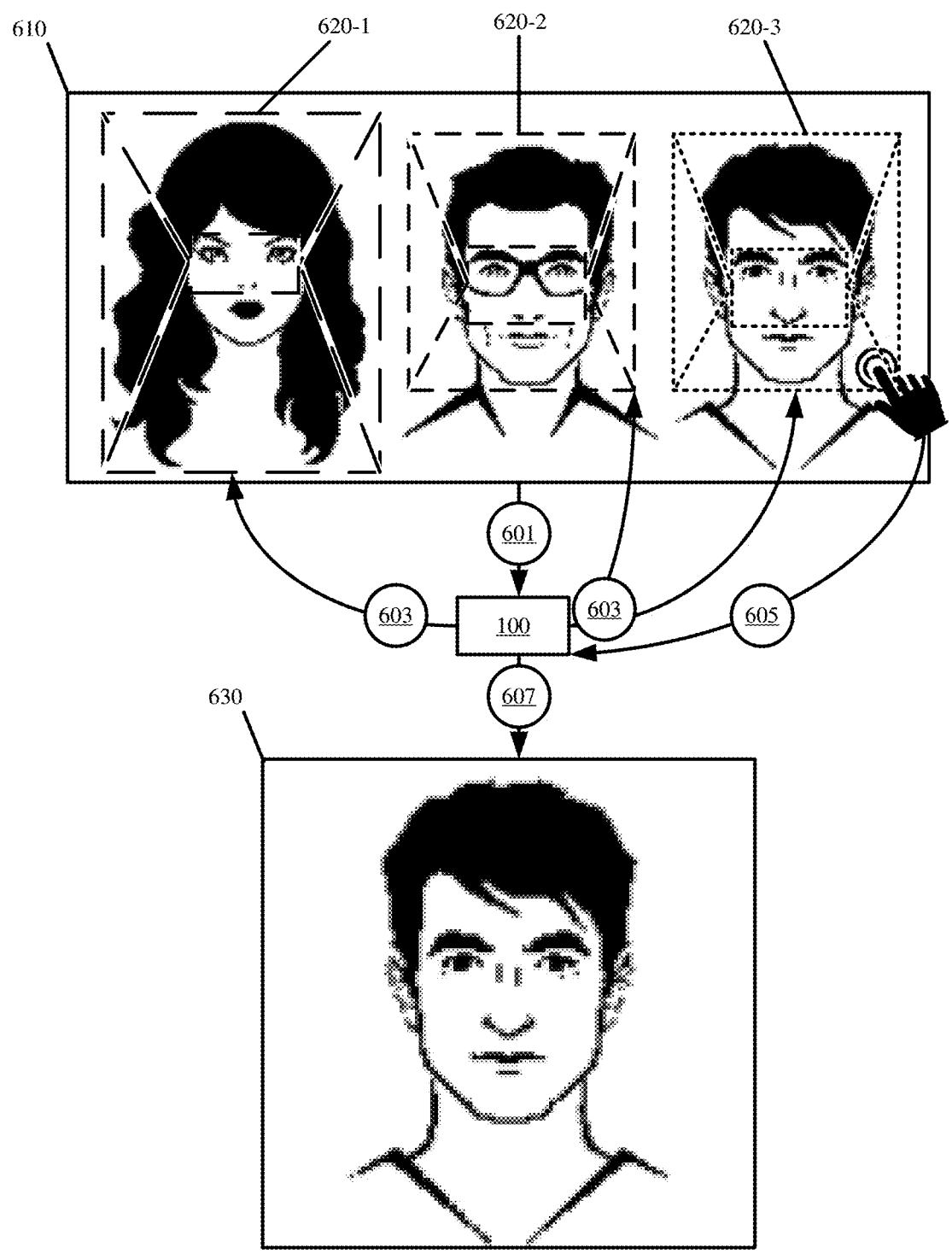
FIG. 6 illustrates an example of directly focusing in on a particular feature based on a selectable region that is defined from automatically detected features in an image in accordance with some embodiments presented herein.

FIG. 6 illustrates an example of directly focusing in on a particular feature based on a selectable region that is defined from automatically detected features in an image in accordance with some embodiments presented herein. As shown in FIG. 6, controller 100 may receive (at 601) and/or display first image 610 with three people.

Controller 100 may perform image analysis in order to detect features (e.g., the eyes and nose) of each person in first image 610, and to define (at 603) selectable regions 620-1, 620-2, and 620-3 (sometimes collectively referred to as "selectable regions 620" or individually as "selectable region 620") based on the detected features for each individual. Controller 100 may customize the size for each selectable region 620 based on the detected features and/or other detected visual characteristics (e.g., the outline of the head).

Controller 100 may then monitor for particular user input that is configured to directly focus on one of the people in first image 610 or features of a particular person in first image 610. The particular user input may include a double-click, long press, double-tap, keyboard key activation or deactivation, and/or touch gesture (e.g., single finger tap, single finger double-tap, two-finger touch, slide gesture, flick gesture, etc.) that is performed using one or more of a mouse, trackpad, touchpad, touchscreen, keyboard, and/or other input devices.

Controller 100 may detect (at 605) the particular user input being issued within selectable region 620-3, wherein selectable region 620-3 may be positioned or defined around the third person's head. It is important to note that the particular user input is not issued directly on any of the detected features or anywhere on the third person's head, but rather in white or empty space that is within selectable region 620-3.

In response to the particular user input being detected within selectable region 620-3, controller 100 may adjust first image 610 and/or produce (at 607) second image 630 that provides a centered and zoomed-in view of the third person's head. Controller 100 may adjust the camera position so that it becomes centered relative to the detected feature of the third person's head. For instance, controller 100 may directly align the camera with the particular feature that corresponds to the third person's eyes and nose, and may increase the zoom by a particular amount to provide the centered and zoomed-in view of the third person's head. In some embodiments, controller 100 may adjust the camera position and field-of-view so that second image 630 encompasses the pixels within selectable region 620-3, and excludes other pixels of first image 610. As shown in FIG. 6, controller 100 may generate second image 630 by centering the camera on the third person's eyes and nose (e.g., the detected feature), and by adjusting the camera zoom to include only the portrait of the third person in second image 630. It is worth noting that second image 630 is not centered on where the particular user input was issued (e.g., where a touch gesture was performed), but rather on the one or more features from which controller 100 defines selectable region 620-3.

Figure 7:
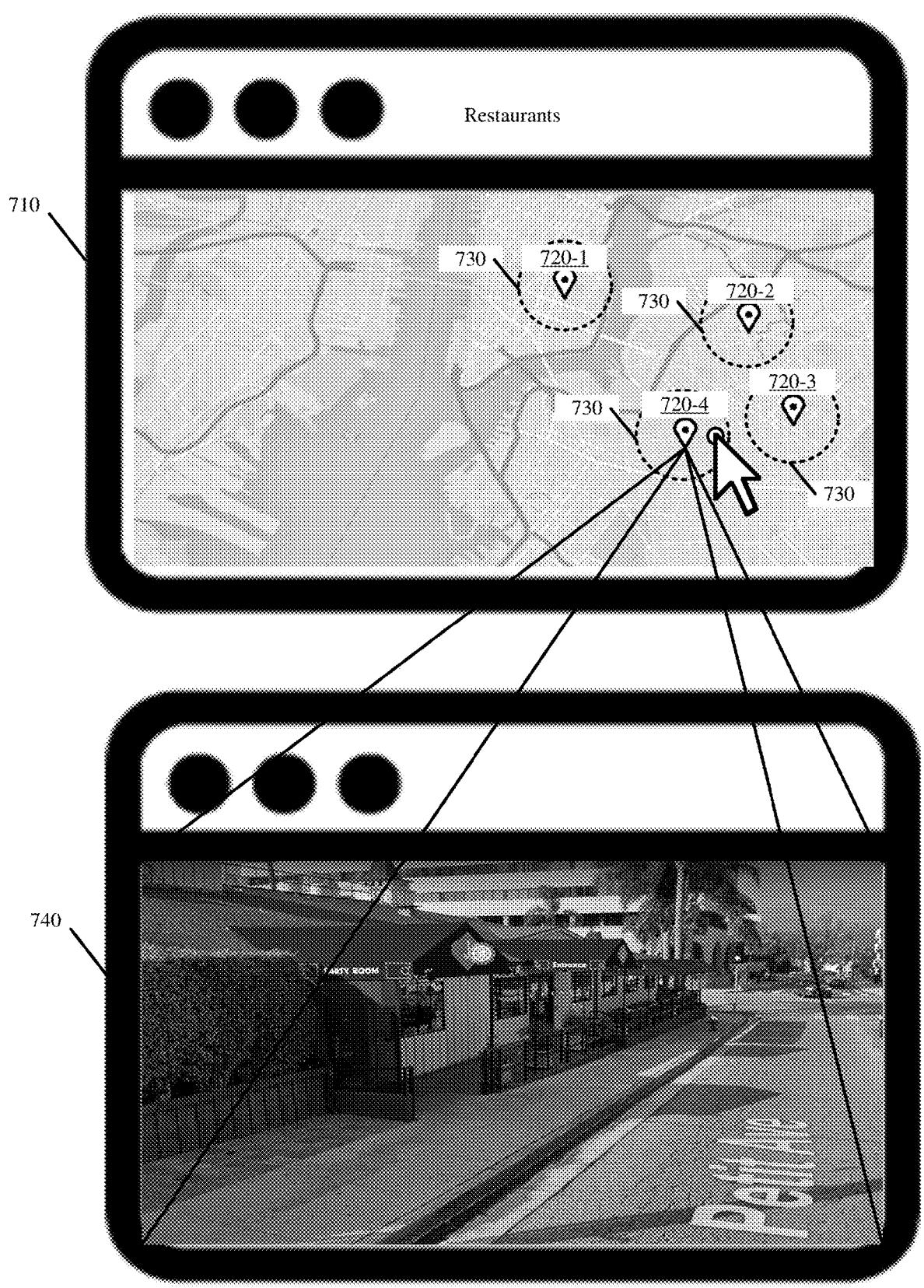
FIG. 7 illustrates an example of structuring and controlling camera positioning and adjustments in an image based on features that are derived from user search criteria in accordance with some embodiments presented herein.

FIG. 7 illustrates an example of structuring and controlling camera positioning and adjustments in an image based on features that are derived from user search criteria in accordance with some embodiments presented herein. A user device may request access to a mapping service, and may request restaurants that are within a particular geographic area. In response, the mapping service may provide first image 710 with a map of the geographic area and pins 720-1, 720-2, 720-3, and 720-4 (sometimes collectively referred to as "pins 720" or individually as "pin 720") that represent restaurants or features that match the user search criteria for restaurants. Each pin 720 may act as a waypoint for identifying the exact location of a restaurant in the map.

Controller 100 may receive first image 710 with the pins. Controller 100 may determine that each pin corresponds to a feature that matches the user search criteria. Each pin may include additional data such as the location of each restaurant, the pixels that represent each restaurant in first image 710, and/or other information. Alternatively, controller 100 may scan the map and the data associated with each pin 720 or at the location of each pin 720 in order to derive the additional data.

Controller 100 may generate selectable region 730 around each pin 720 corresponding to a directly focusable feature. In this figure, controller 100 may generate a circular selectable region around each pin 720 that can be used to focus on each corresponding feature without having to precisely select or accurately issue input directly on each pin 720.

In response to detecting particular user input within selectable region 730 of pin 720-4, controller 100 may adjust the camera position and zoom to provide second image 740. Specifically, controller 100 may determine that pin 720-4 is selected based on the particular user input within selectable region 730 of pin 720-4, may determine that pin 720-4 corresponds to a particular restaurant, and may provide an angled street view for the storefront of the particular restaurant in second image 740. In providing the angled street view, controller 100 adjusts the camera position to a custom angled position that is at street level and that is angled to provide a perspective view of the storefront. Controller 100 also customizes the camera zoom depth to ensure that the entire storefront is presented within second image 740.

As shown by the different camera positions and zoom depths in FIGS. 6 and 7, controller 100 may customize or dynamically adjust the camera positions and zoom depths for different features. In other words, controller 100 does not perform the same static repositioning and zooming-in for different features.

Controller 100 may classify each feature upon detection, and define different camera adjustments based on the feature classification. For instance, controller 100 may detect that the selected feature in FIG. 6 corresponds to a face, and may present the face by centering the camera to provide a direct front view of the face with a first amount of zoom, whereas controller 100 may detect that the selected feature in FIG. 7 corresponds to a business location or property, and may present the location or property by angling the camera to provide a perspective side view of the location or property with a different second amount of zoom (e.g., street level).

In some embodiments, controller 100 may tier the structured and controlled camera positioning and adjustments to allow for a hierarchical focusing of features. The hierarchical focusing of features may include controller 100 shifting focus from a plurality of features presented at a first zoom depth (e.g., a first image) to a clustered set of the plurality features at a closer second zoom depth (e.g., a second image resulting from zooming into the first image), and drawing focus from the clustered set of feature to a subset or particular feature of clustered set of features at a third zoom depth that is closer than the second zoom depth (e.g., a third image resulting from zooming into the second image).

The hierarchical focusing of features may be provided when there is a large clustering of different features in an image, when the features are layered at different z-depths in a 3D image, and/or when the selectable regions of two or more features cannot be made large enough without overlap due to the zoom depth at which the image is presented. Accordingly, for images with lots of features or closely located features, controller 100 may hierarchically direct focus to features at different feature tiers in order to improve selection accuracy.

Figure 8:
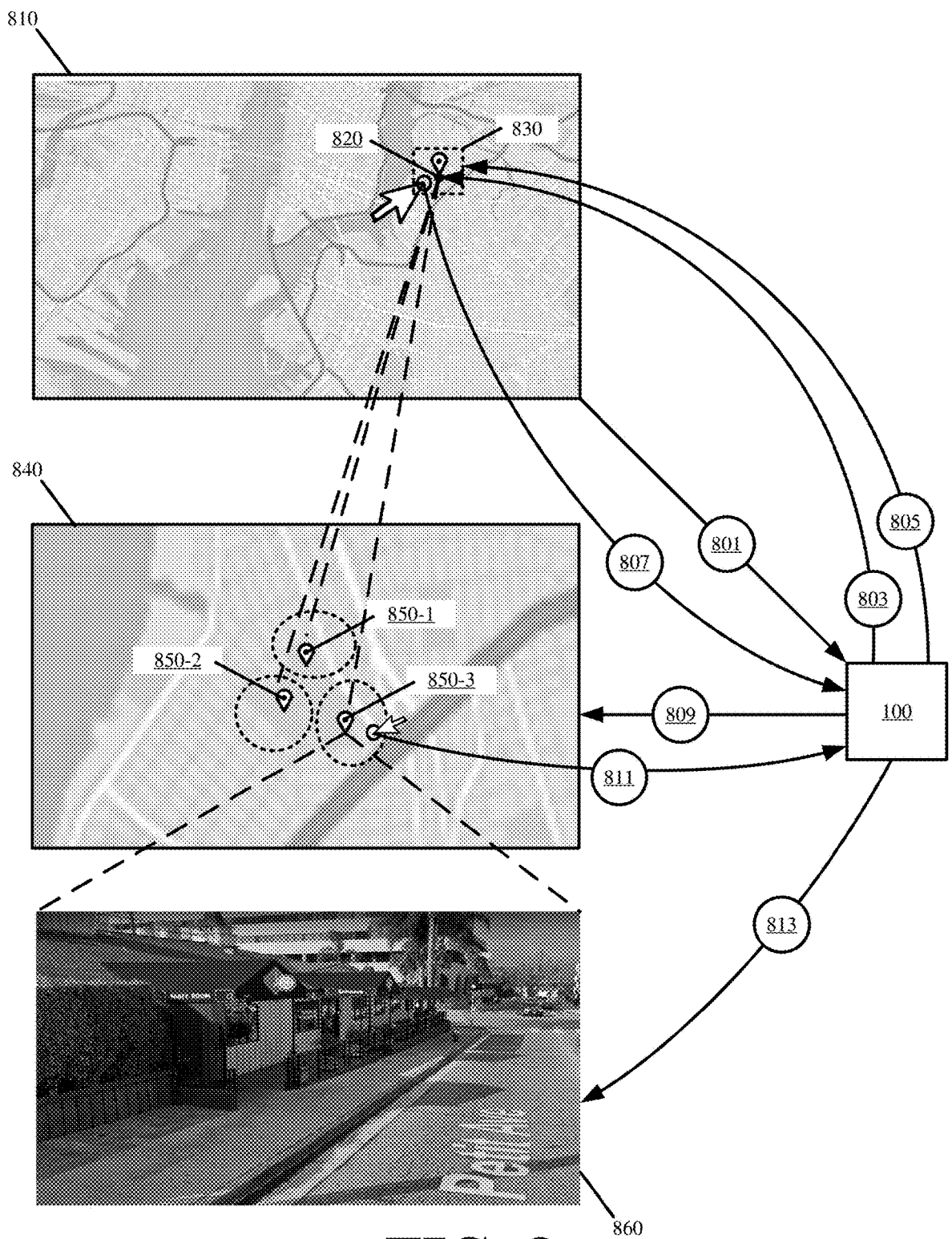
FIG. 8 illustrates an example of hierarchically directing focus to different features at different feature tiers in accordance with some embodiments presented herein.

FIG. 8 illustrates an example of hierarchically directing focus to different features at different feature tiers in accordance with some embodiments presented herein. Controller 100 may receive (at 801) first image 810 corresponding to a map at a first zoom depth.

Controller 100 may analyze first image 810, and may determine that there is a tight concentration of features at or around position 820. For example, controller 100 may determine that there are two or more features within a threshold distance of one another. For this example, the threshold distance may be set to 100 pixels, such that if the pixels representing two or more features are within 100 pixels of one another, then controller 100 may determine that those two or more features are within the threshold distance, and thereby represent a tight concentration of features at position 820. Position 820 may include the center point for the two or more features found to be in the tight concentration in first image 810.

In some embodiments, controller 100 may identify features at or around position 820 that satisfy the same feature criteria, or that are classified to be the same (e.g., all the features in the tight concentration of features at position 820 are restaurants, fast-food restaurants, gas stations, etc.). Controller 100 may then determine that the features at or around position 820 cannot be readily distinguished in first image 810 as distinct features at the first zoom depth, and/or may determine that the features cannot be defined with sufficiently large and non-overlapping selectable regions at the first zoom depth because of their proximity to one another. Accordingly, controller 100 may provide tiered focusing of the features at or around position 820.

The tiered focusing may include controller 100 representing (at 803) the set of features at or around position 820 as a single feature group in first image 810. In this figure, the single feature group may comprise three distinct features that are in close proximity to one another (e.g., three distinct features that are less than a threshold distance apart from one another). Representing (at 803) the set of features with the single feature group may include presenting a single icon, identifier, or other indicator for the single feature group at position 820 instead of a different icon, identifier, or other indicator for each of the three distinct features at their respective positions in first image 810. Controller 100 may determine the center point for the three distinct features, and may define the single feature group at the center point of the three distinct features, wherein the center point of the single feature group is at position 820.

In some embodiments, the icon representing a feature group may be different than the icon that is used to represent a feature. In some other embodiments, the same icons may be used to represent a feature group and a particular feature.

Controller 100 may define (at 805) selectable region 830 around the feature group so that a user may focus in on the features of the feature group without having to precisely click, press, or otherwise select the icon representing the feature group in first image 810 at position 820. Controller 100 may define (at 805) selectable region 830 with a size and/or shape that covers and/or extends beyond the positions of each of the three features in the feature group. In other words, if the three features of the feature group fall within a 100×100 pixel region of first image 810, controller 100 may define (at 805) selectable region 830 as a 150×150 pixel region that includes and extends beyond the 100×100 pixel region with the three features.

In response to detecting (at 807) particular user input within selectable region 830 of the feature group, controller 100 may present (at 809) second image 840. Second image 840 may provide a zoomed-in view of first image 810 that is centered on position 820 of the feature group. For instance, controller 100 may zoom-in by 25-75% on position 820 of first image 810 in order to generate second image 840 and to create enough separation between the three features in the feature group so that the features can be individually presented with non-overlapping selectable regions. In presenting (at 809), controller 100 may replace the icon for the single feature group with individual icons 850-1, 850-2, and 850-3 for each of the three features of the single feature group in second image 840, wherein the individual icons 850-1, 850-2, and 850-3 are placed at the position of each feature in second image 840 rather than at position 820 (e.g., the center point for the feature group). Controller 100 may also define and provide a non-overlapping selectable region for each distinct feature. As shown in FIG. 8, controller 100 may customize the shape of each selectable region to prevent overlap with a neighboring feature.

Controller 100 may detect (at 811) the particular user input being issued within the selectable region of the third feature (that is represented by icon 850-3) while presenting second image 840. In response to the particular user input being issued within the selectable region of the third feature, controller 100 may present (at 813) third image 860. Third image 860 may provide a further zoomed-in view of second image 840 that is centered on and provides a zoomed-in view of the third feature. As shown in FIG. 8, third image 860 may present a street view image of the restaurant represented by the third feature.

As shown in FIG. 8, the particular user input was not issued directly on any pin, waypoint, or feature presented in any of the images. Nevertheless, controller 100 was able to generate a focused first-tier view that provided a centered and zoomed-in view of the three features forming the feature group based on the particular user input being issued within selectable region 830 of the feature group in first image 810, and to generate a more focused second-tier view that provided a centered and zoomed-in view of the third feature in the feature group based on the particular user input being issued within the selectable region of the third feature in second image 840.

Figure 9:
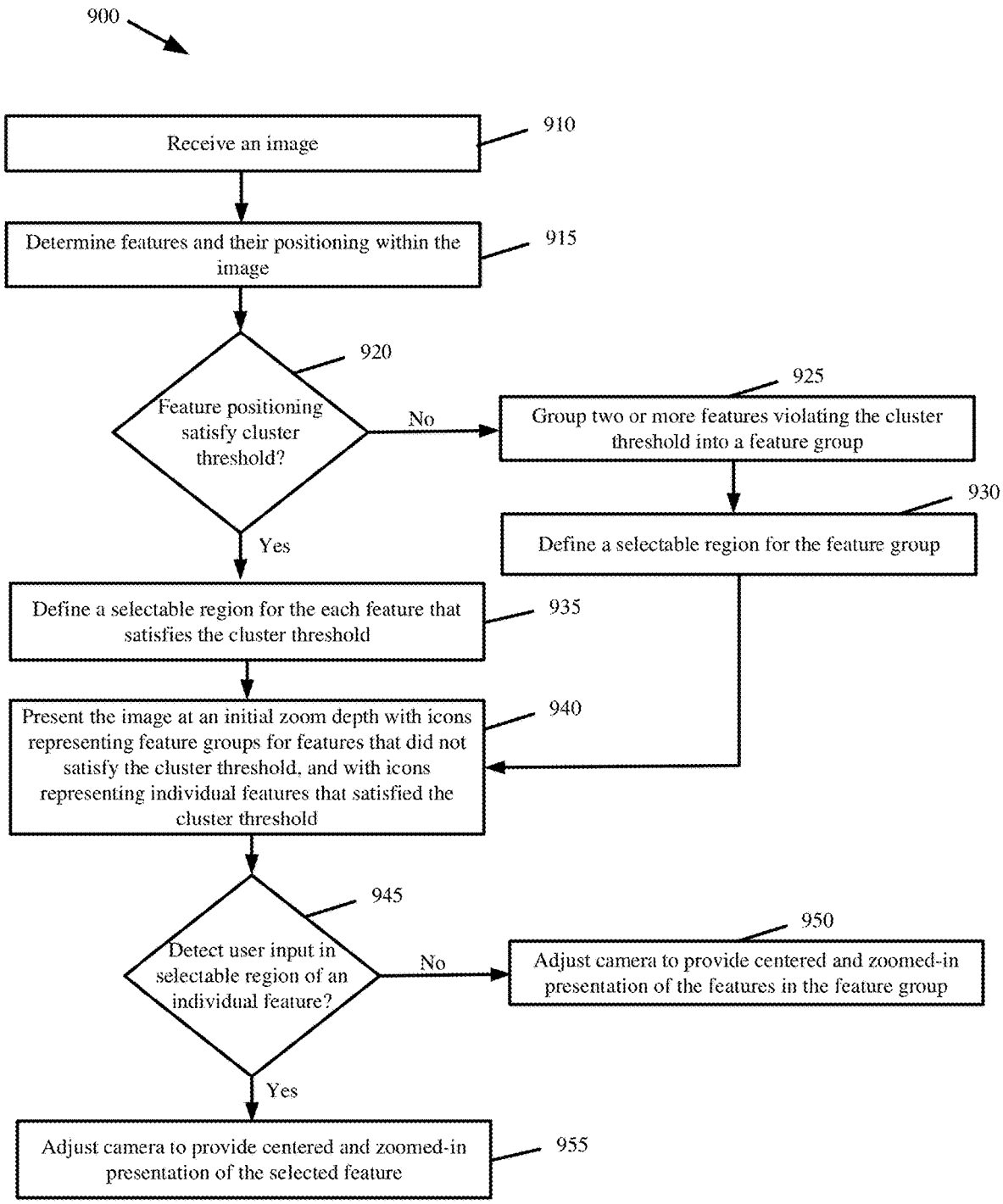
FIG. 9 presents a process for generating the hierarchical feature tiers and directing focus to different features at the different hierarchical feature tiers in accordance with some embodiments presented herein.

FIG. 9 presents a process 900 for generating the hierarchical feature tiers and directing focus to different features at the different hierarchical feature tiers in accordance with some embodiments presented herein. Process 900 may be implemented by controller 100.

Process 900 may include receiving (at 910) an image. Controller 100 may receive (at 910) the image in response to a user request to access the image, or may receive (at 910) the image in response to a third-party service loading or providing the image to a user device.

Process 900 may include determining (at 915) features and their positioning within the image. Controller 100 may determine (at 915) the features of the image via data provided with the image and/or image analysis. Determining (at 915) the feature positioning may include identifying the pixels that represent each feature in the image.

Process 900 may include determining (at 920) whether the feature positioning satisfies a cluster threshold when presenting the image at an initial zoom depth. The cluster threshold may specify a minimum distance or separation (e.g., minimum number of pixels) between two neighboring features at the initial zoom depth. For instance, features that are separated by at least 100 pixels may satisfy the cluster threshold, and features that are separated by less than 100 pixels may not satisfy the cluster threshold when the image has a resolution of 1920×1080 and is at the initial zoom depth.

In response to determining (at 920—No) that the positioning for two or more features does not satisfy the cluster threshold, process 900 may include grouping (at 925) the two or more features into a feature group. Grouping (at 925) the two or more features into the feature group may include creating an identifier for the feature group, and linking the identifier to each of the features that are included in that feature group. Grouping (at 925) the two or more features into the feature group may also include determining a center point for the feature group based on the center point of each of the two or more features, and replacing icons for the two or more features in the received image with a single icon for the feature group. The single icon for the feature group may be presented in the received image at the determined feature group center point, wherein the feature group center point may coincide to the position in the received image that is in between or central to the positions of the two or more features. For instance, controller 100 may determine a mean or median position based on the positions of the two or more features, with positioning that violates the cluster threshold, in the received image, and may present the single feature group icon at the mean or median position. Process may include defining (at 930) a selectable region around the feature group that can be used to draw focus to the feature group.

In response to determining (at 920—Yes) that the positioning for two or more features satisfies the cluster threshold, process 900 may include defining (at 935) a selectable region for each of the two or more features with positioning that satisfies the cluster threshold. Accordingly, the image at the initial zoom depth may include a first set of features that are represented by a feature group in the image, and a second set of features that are individually represented in the image at the initial zoom depth.

Process 900 may include presenting (at 940) the image at the initial zoom depth with icons representing feature groups for features that did not satisfy the cluster threshold, and with icons representing individual features that satisfied the cluster threshold. Process 900 may include detecting (at 945) the particular user input being issued within a selectable region defined for one of the feature groups or individual features presented with the image at the initial zoom depth.

In response to detecting (at 945—No) the particular user input being issued in the selectable region of a feature group, process 900 may include adjusting (at 950) the presented image by centering the image on the position of the selected feature group, by zooming-in by a first amount to the position of the selected feature group, by removing the icon for the selected feature, and/or by providing individual icons for features that were included as part of the selected feature group and/or icons for other features that fall within the adjusted camera field-of-view (e.g., the field-of-view resulting from centering and zooming-in the camera onto the feature group). The first amount of zoom may be equal to a zoom amount that retains each of the features, that were included as part of the selected feature group, in the camera's field-of-view, and/or that provides a particular amount of separation (e.g., at least 100 pixels) between those features. Adjusting (at 950) the presented image may further include defining and/or presenting individual selectable regions for each of the features that were part of the selected feature group.

In response to detecting (at 945—Yes) the particular user input being issued in the selectable region of an individual feature, process 900 may include adjusting (at 955) the presented image by centering the image on the position of the selected feature, and by zooming-in by a second amount to the position of the selected feature. The second amount of zoom may differ from the first amount of zoom, and may be more or less than the first amount of zoom. In particular, the second amount of zoom may be equal to a zoom amount that presents the selected feature with a particular enlarged size in the image (e.g., present the selected feature so that 50% of the image pixels are pixels of the selected feature).

In some embodiments, the received image or the first image that is presented to a user may be different than the second image that controller 100 presents upon focusing in on a particular feature that is selected in the first image. In other words, centering and zooming-in on a selected feature or feature group may include retrieving and rendering one or more of a different second set of images that include the centered and zoomed-in view of the selected feature or feature group.

Figure 10:
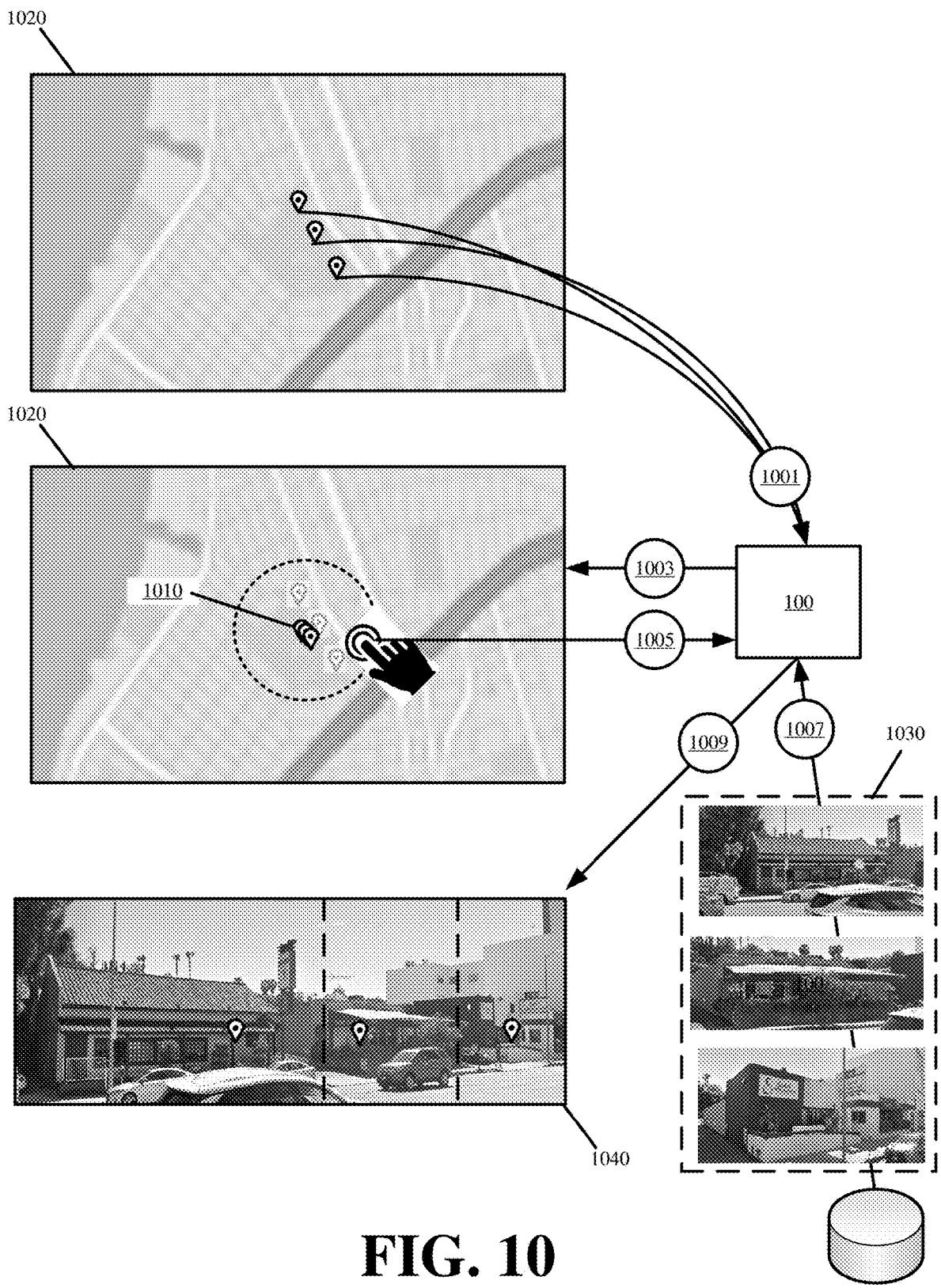
FIG. 10 illustrates an example of the controller dynamically constructing an image that provides a centered and zoomed-in view of a particular feature group based on a selection of the particular feature group in accordance with some embodiments presented herein.

FIG. 10 illustrates an example of controller 100 dynamically constructing an image that provides a centered and zoomed-in view of particular feature group 1010 based on a selection of particular feature group 1010 in accordance with some embodiments presented herein. As shown in FIG. 10, controller 100 may receive initial image 1020.

Controller 100 may scan initial image 1020 to detect the feature therein, and may determine (at 1001) that three features at an initial zoom depth of initial image 1020 are positioned too closely together and therefore violate the cluster threshold. Accordingly, rather than present individual icons for each of the three features with overlap or overlapping selectable regions, controller 100 may group the three features to particular feature group 1010, and may present (at 1003) initial image 1020 with one icon for particular feature group 1010. The feature group icon may indicate the presence of multiple features in the area. Controller 100 may also present (at 1003) a selectable region around particular feature group 1010.

Controller 100 may detect (at 1005) the particular user input being issued within the selectable region of particular feature group 1010. The particular user input may cause controller 100 to provide a centered and zoomed-in view of each feature in particular feature group 1010. In this figure, particular feature group 1010 may include three restaurants that are located on the same street. Accordingly, providing the centered and zoomed-in view may include dynamically generating a street view that presents the storefront for each of the three restaurants (e.g., three features) that form particular feature group 1010.

Controller 100 may generate the street view by retrieving (at 1007) second set of images 1030 from an image database. Second set of images 1030 may include individual street view images for the storefront of each restaurant included in particular feature group 1010, and/or images of other storefronts that are located between two of the restaurants. Controller 100 may retrieve (at 1007) second set of images 1030 by providing the area that is covered by particular feature group 1010, or by providing the positions for the first and last restaurants included in particular feature group 1010 so that controller 100 may retrieve (at 1007) not only the images for the restaurant storefronts, but also any other properties that are located along the same street in between the first and last restaurants on that street.

Controller 100 may construct (at 1009) a single image 1040 from stitching or otherwise combining the retrieved second set of images, and by adjusting the camera position and/or zoom depth so that the entirety of constructed image 1040 and/or all features of particular feature group 1010 are presented in constructed image 1040. It should be noted that controller 100 may customize the camera position and zoom depth depending on the number of features in the feature group and the positioning of the features in the feature group. For instance, controller 100 may zoom-in less if the particular feature group included 5 restaurants instead of 3 because the camera would require a larger field-of-view in order to present 5 restaurants as opposed to presenting only 3 restaurants. Controller 100 may present constructed image 1040 with the adjusted camera position and zoom depth on one or more requesting user devices.

In some embodiments, controller 100 may define selectable regions for each of the three features presented in constructed image 1040. Controller 100 may monitor for single user input that is provided in the selectable region of a particular feature presented in constructed image 1040, and may generate a third view or image that is centered and zoomed-in on the particular feature. In other words, rather than present all three feature of constructed image 1040, the third view or image may present provide a zoomed-in view that more prominently displays the particular feature and/or removes the other features from view.

Controller 100 may include a standalone device or an integrated component of a user device or a system device. When operating as a standalone device, controller 100 may intercept data exchanged between a user device and a system device, and may enhance functionality of the system device by automatically detecting features in the images or maps provided by the system device, and by directly focusing on a particular feature in response to detecting single user input that is provided within the selectable region of the particular feature. Controller 100 may operate as an integrated component of the user device by running as part of one or more applications on the user device that access images and/or maps. For instance, controller 100 may operate as part of an image viewing application that is installed on the user device. When the application loads an image, controller 100 may perform the feature detection and direct feature focusing locally on the user device. Alternatively, controller 100 may operate as an integrated component or service of a system device that remotely provides user devices with images and/or maps. For instance, user devices may request maps and/or driving instructions from a remote mapping system. Controller 100 may operate as part of the remote mapping system, and may enhance the maps that are provided by the remote mapping system to allow for the direct feature focusing.

Figure 11:
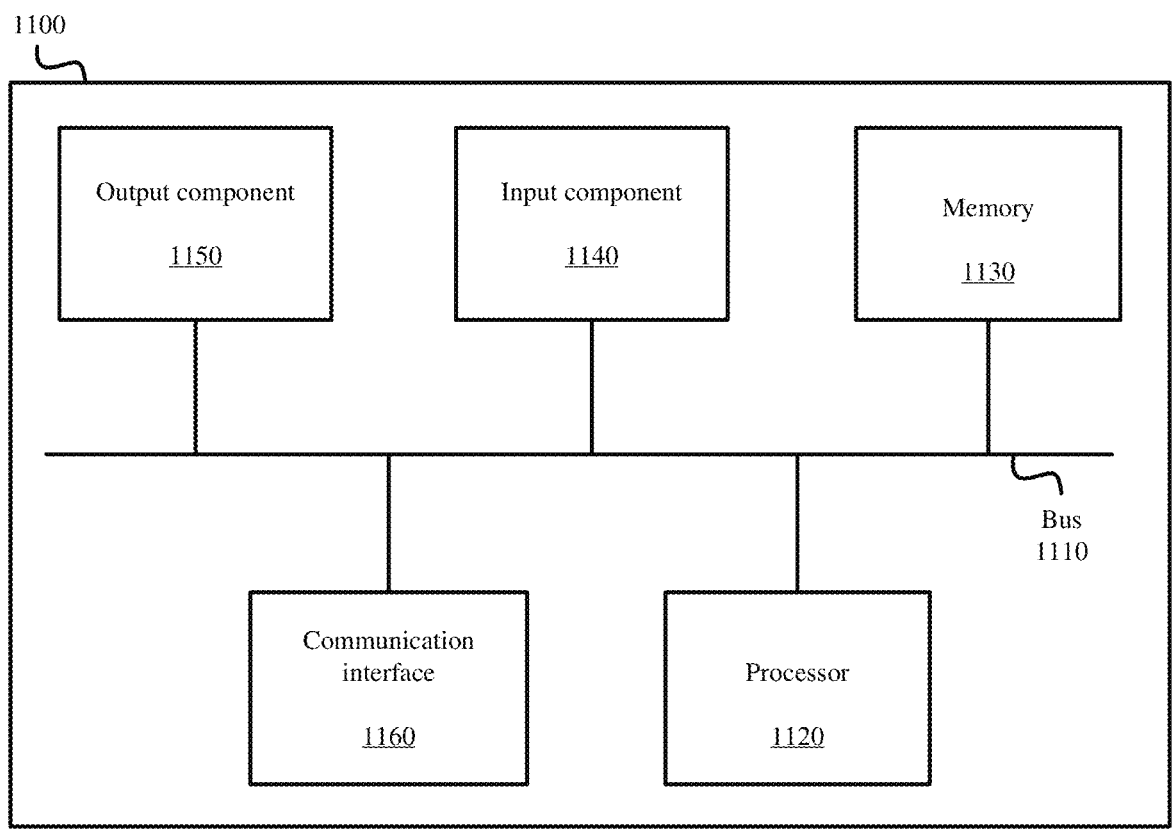
FIG. 11 illustrates example components of one or more devices, according to one or more embodiments described herein.

FIG. 11 is a diagram of example components of device 1100. Device 1100 may be used to implement one or more of the devices or systems described above (e.g., controller 100, user device, image database, etc.). Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving an image that is centered on a first point and that is presented at a first zoom depth;
detecting a feature at a second point in the image, wherein the second point is away from the first point;
defining a selectable region for the feature at the second point in the image without user input based on a shape and size of the feature in the image, wherein the selectable region extends beyond a border of the feature;
detecting a single user input corresponding to a selection of a third point that is away from the second point, outside the border of the feature, and within the selectable region; and
providing focus to the feature in response to detecting the single user input, wherein providing the focus comprises:
recentering the image on the second point of the feature instead of the third point at which the single user input is issued in response to the third point being within the selectable region defined for the feature, and
adjusting a zoom depth of the image by increasing from the first zoom depth to a second zoom depth that is derived from the shape and size of the feature in the image at the first zoom depth and independent of the single user input, wherein the feature is enlarged at the second zoom depth relative to the first zoom depth.

2. The method of claim 1, wherein defining the selectable region comprises:
determining a first set of pixels that represent the feature in the image; and
extending the selectable region to include the first set of pixels and a different second set of pixels that surround the first set of pixels, wherein extending the selectable region is performed prior to and independent of any user input or the selection of the third point with the single user input.

3. The method of claim 2,
wherein the second point corresponds to one or more pixels within the second set of pixels and outside the first set of pixels that represent the feature in the image.

4. The method of claim 1 further comprising:
scanning data that is provided with the image, wherein the data comprises one or more of image metadata or data provided by a remote server; and
detecting a plurality of features at different points in the image based on scanning the data that is provided with the image, wherein the plurality of features comprises the feature at the second point in the image.

5. The method of claim 1 further comprising:
scanning visual characteristics of the image independent of the single user input or other user input;
detecting one or more regions in the image where the visual characteristics deviate from the visual characteristics of neighboring regions; and
defining the one or more regions as one or more features for receiving direct focus, wherein the one or more features comprises the feature at the second point in the image.

6. The method of claim 1 further comprising:
determining one or more points-of-interest in the image based on metadata associated with different points in the image;
determining positions for the one or more points-of-interest; and
identifying a plurality of features at the positions for the one or more points-of-interest.

7. The method of claim 6 further comprising:
receiving a user query comprising criteria for the one or more points-of-interest; and
wherein determining the one or more points-of-interest comprises identifying the one or more points-of-interest that satisfy the criteria.

8. The method of claim 1, wherein defining the selectable region comprises:
determining that the feature has a particular shape in the image; and
generating the selectable region to include a set of pixels that extend beyond a border of the feature, and that form an enlarged area in the particular shape around the border of the feature.

9. The method of claim 1,
wherein the image is a map;
wherein the feature corresponds to a first address in the map;
wherein the single user input is issued at a different second address in the map; and
wherein providing the focus further comprises focusing on the first address in the map despite the single user input being issued at the different second address.

10. The method of claim 1,
wherein the feature corresponds to a first set of pixels in the image;
wherein the single user input is issued over a different second set of pixels in the image; and
wherein providing the focus further comprises centering and zooming-in on the first set of pixels in the image despite the single user input being issued over the second set of pixels.

11. The method of claim 1 further comprising:
detecting a plurality of features that are positioned within a cluster threshold of one another in the image;
generating a feature group for the plurality of features, wherein a center point of the feature group is based on a position of each feature in the plurality of features; and
presenting a particular icon for the feature group in the image at a fourth point in the image that corresponds to the center point of the feature group, wherein presenting the particular icon comprises replacing individual icons for each feature of the plurality of features with the particular icon.

12. The method of claim 11 further comprising:
defining a second selectable region for the feature group that extends beyond a border of each feature in the plurality of features;
detecting a single user input that is issued within the second selectable region; and
providing focus to the feature group in response to detecting the single user input that is issued within the second selectable region, wherein providing focus to the feature group comprises:
changing a center point of the image from the first point to the center point of the feature group,
increasing from the first zoom depth to a third zoom depth, and
replacing the icon for the feature group with a distinct icon at the position of each feature of the plurality of features.

13. The method of claim 12, wherein providing focus to the feature group further comprises:
defining a non-overlapping selectable region around each feature of the plurality of features.

14. The method of claim 1, wherein the single user input comprises:
a particular click operation,
a particular touch gesture, or
a keyboard key activation occurring in conjunction with positioning of a cursor at the third point.

15. The method of claim 1 further comprising:
performing image analysis in response to receiving the image; and
differentiating different sets of pixels as a plurality of features of the image based on performing the image analysis, wherein the plurality of features comprises the feature at the second point.

16. The method of claim 15 further comprising:
presenting the image with a visual indicator over each of the different sets of pixels where a different feature of the plurality of features is detected as a result of the image analysis, wherein the image omits visual indicators for the plurality of features.

17. The method of claim 16 further comprising:
adding to a visual presentation of the image, a graphical shape around each visual indicator based on a selectable region that is defined for each feature of the plurality of features, wherein each graphical shape extends beyond the set of pixels of a feature represented by a visual indicator within the selectable region that is defined for that feature.

18. The method of claim 1, wherein providing the focus further comprises:
repositioning a cursor from the third point at which the single user input is detected to the second point corresponding to a center point of the feature and a center point of the image after said recentering.

19. A system comprising:
one or more processors configured to:
receive an image that is centered on a first point and that is presented at a first zoom depth;
detect a feature at a second point in the image, wherein the second point is away from the first point;
define a selectable region for the feature at the second point in the image without user input based on a shape and size of the feature in the image, wherein the selectable region extends beyond a border of the feature;
detect a single user input corresponding to a selection of a third point that is away from the second point, outside the border of the feature, and within the selectable region; and
provide focus to the feature in response to detecting the single user input, wherein providing the focus comprises:
recentering the image on the second point of the feature instead of the third point at which the single user input is issued in response to the third point being within the selectable region defined for the feature, and
adjusting a zoom depth of the image by increasing from the first zoom depth to a second zoom depth that is derived from the shape and size of the feature in the image at the first zoom depth and independent of the single user input, wherein a size of the feature in the image is enlarged increased at the second zoom depth relative to the first zoom depth.

20. A non-transitory computer-readable medium, storing a plurality of processor-executable instructions to:
receive an image that is centered on a first point and that is presented at a first zoom depth;
detect a feature at a second point in the image, wherein the second point is away from the first point;
define a selectable region for the feature at the second point in the image without user input based on a shape and size of the feature in the image, wherein the selectable region extends beyond a border of the feature;
detect a single user input corresponding to a selection of a third point that is away from the second point, outside the border of the feature, and within the selectable region; and
provide focus to the feature in response to detecting the single user input, wherein providing the focus comprises:
recentering the image on the second point of the feature instead of the third point at which the single user input is issued in response to the third point being within the selectable region defined for the feature, and
adjusting a zoom depth of the image by increasing from the first zoom depth to a second zoom depth that is derived from the shape and size of the feature in the image at the first zoom depth and independent of the single user input, wherein a size of the feature in the image is enlarged increased at the second zoom depth relative to the first zoom depth.

* * * * *